US 6,313,556 B1

(12) United States Patent
Dombrovski et al.

(10) Patent No.: US 6,313,556 B1
(45) Date of Patent: Nov. 6, 2001

(54) SUPERCONDUCTING ELECTROMECHANICAL ROTATING DEVICE HAVING A LIQUID-COOLED, POTTED, ONE LAYER STATOR WINDING

(75) Inventors: Viatcheslav V. Dombrovski, Willoughby Hills; David I. Driscoll, South Euclid; Boris A. Shovkhet, Beachwood, all of OH (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/408,614

(22) Filed: Sep. 30, 1999

(51) Int. Cl.[7] ................................................. H02K 5/00
(52) U.S. Cl. .............................. 310/91; 310/179; 29/596
(58) Field of Search ........................ 310/179, 91, 54, 310/208, 254; 29/596, 605

(56) References Cited

U.S. PATENT DOCUMENTS

| | | | |
|---|---|---|---|
| 3,662,199 | * 5/1972 | Anderson et al. | 310/208 |
| 3,693,036 | * 9/1972 | Schmitt | 310/52 |
| 3,837,072 | * 9/1974 | Moberg | 29/596 |
| 4,123,676 | * 10/1978 | Cooper et al. | 310/52 |
| 4,321,497 | * 3/1982 | Long | 310/198 |
| 4,330,726 | * 5/1982 | Albright et al. | 310/254 |
| 4,604,541 | * 8/1986 | Murasato et al. | 310/180 |
| 4,868,970 | * 9/1989 | Schultz et al. | 29/596 |
| 5,057,726 | * 10/1991 | Mole et al. | 310/67 R |
| 5,212,419 | * 5/1993 | Fisher et al. | 310/254 |
| 5,744,888 | * 4/1998 | Zajc et al. | 310/185 |
| 5,777,420 | 7/1998 | Gamble et al. | 310/261 |
| 5,880,547 | 3/1999 | Shoykhet | 310/91 |
| 5,900,687 | * 5/1999 | Kondo et al. | 310/71 |

FOREIGN PATENT DOCUMENTS

06233483A * 8/1994 (JP) .

OTHER PUBLICATIONS

Aized, D. et al., "Status of the 1,000 hp HTS Motor Development," posted May 27, 1999.

* cited by examiner

*Primary Examiner*—Joseph Waks
(74) *Attorney, Agent, or Firm*—Michael A. Jaskolski; William R. Walbrun; John J. Horn

(57) ABSTRACT

A superconducting electromechanical rotating (SER) device, such as a synchronous AC motor, includes a superconducting field winding and a one-layer stator winding that may be water-cooled. The stator winding is potted to a support such as the inner radial surface of a support structure and, accordingly, lacks hangers or other mechanical fasteners that otherwise would complicate stator assembly and require the provision of an unnecessarily large gap between adjacent stator coil sections. The one-layer winding topology, resulting in the number of coils being equal to half the number of slots or other mounting locations on the support structure, allows one to minimize or eliminate the gap between the inner radial ends of adjacent straight sections of the stator coilswhile maintaining the gap between the coil knuckles equal to at least the coil width, providing sufficient room for electrical and cooling element configurations and connections. The stator winding may be potted to the support structure or other support, for example, by a one-step VPI process relying on saturation of an absorbent material to fill large gaps in the stator winding or by a two-step process in which small gaps are first filled via a VPI or similar operation and larger gaps are then filled via an operation that utilizes the stator as a portion of an on-site mold.

28 Claims, 6 Drawing Sheets

SUPERCONDUCTING ELECTROMECHANICAL ROTATING DEVICE HAVING A LIQUID-COOLED, POTTED, ONE LAYER STATOR WINDING

GOVERNMENT LICENSE RIGHTS

The U.S. Government has a paid-up license in this invention and the right in limited circumstances to require the patent owner to license others on reasonable terms as provided for by the terms of Contract Number DE-FC02-93CH10580, awarded by the Department of Energy.

BACKGROUND OF THE INVENTION

1. Field of the Invention

The invention relates to superconducting electromechanical rotating (SER) devices and, more particularly relates to an SER device having a stator assembly including a stator winding which is potted to an associated support. The invention additionally relates to a method of potting a stator winding of an SER device to the associated support.

2. Discussion of the Related Art

Recent advances in superconductivity have led to an increased interest in the development and commercialization of superconducting electromechanical rotating (SER) devices such as large electric generators and large electric motors including synchronous AC motors. The device includes a superconductive rotor having a vacuum jacket and a stator coaxially surrounding the rotor. The superconducting coils are disposed inside of the vacuum jacket on a coil support structure. The coil support structure and coils are cooled to a cryogenic temperature. One such device is the so-called high temperature superconducting (HTS) electromechanical device which uses a HTS winding in the rotor of the device rather than a low temperature superconducting winding. In the case of a synchronous AC motor, the stator and rotor of the typical SER device are configured such that the rotor is rotated synchronously by the rotating stator magnetic field.

The usual stator of an SER device consists of a winding formed from coils that are mounted in axially extending, peripherally-spaced slots in the inner radial surface of a support structure of the device and that are held in place by fixturing straight portions of the winding to the slots and by mechanical hangers and/or rope or fabric in the end winding areas. Because the SER device operates at a much higher magnetic flux level than other machines, it typically does not have magnetic teeth. Such a machine is referred to as an "air core" machine. In an air core machine, the hypothetical ideal stator would have 100% of the space between the back-iron and the rotor filled with copper. However, in practice, practical limitations are imposed on the copper content of an SER device. These practical limitations include the insulation thickness, the end winding length, the need to cool the winding, and coil manufacturing issues. These practical limitations represent a problem in SER stator winding design.

The usual stator winding topology used in SER devices is not the optimal solution to this problem. The usual stator winding has a so-called two-layer topology in which 1) the number of coils equals the number of slots in the support surface on which the stator winding is mounted and 2) each slot contains one section of two different coils. Windings having a two-layer topology require relatively long end windings. This problem is exacerbated if the gap between adjacent straight portions of the coils is decreased in an effort to increase the total effective copper content of the device because, as the gap is decreased, the end winding length is increased proportionally, theoretically tending to infinity when the gap tends to zero.

Another problem-associated with usual SER stator winding designs is that they are relatively difficult to mount on the support structure. The usual stator winding is formed from a plurality of coils inserted into the slots in the inner radial surface of the support structure. The stator winding is then fixed in the slots using topsticks at the straight sections of the coils and mechanical fasteners such as hangers and/or fabric or rope at the end winding areas. This mounting technique is cumbersome and highly labor-intensive. Stator winding mounting becomes increasingly difficult as the space between adjacent straight portions of the stator coils is progressively decreased in an effort to increase copper content and current density. In fact, at one point, further gap reduction, even if not precluded by cooling constraints or other constraints, is precluded by the physical spacing required to receive the mechanical fasteners between coil portions.

OBJECTS AND SUMMARY OF THE INVENTION

It is therefore a first principal object of the invention to provide a superconducting electromechanical rotating (SER) device having a stator which has a relatively high copper content and current density and which is connected to an associated support structure in a simple manner that minimizes or eliminates constraints on the available spacing between adjacent straight stator coil portions.

A second object of the invention is to provide a SER device that meets the first principal object and the stator of which has ample room at the ends of its winding for coil connections.

In accordance with a first aspect of the invention, these objects are achieved by providing a SER device, such as an AC synchronous motor, that includes a rotor and a stator. The rotor includes a rotor winding which is cooled with a cryogenic fluid so as to be rendered superconductive. The stator surrounds the rotor and is selectively energizeable with an electric current to drive the rotor to rotate. The stator includes 1) a support structure which surrounds the rotor and which has an inner radial surface which faces an outer radial surface of the rotor, and 2) a liquid-cooled stator winding mounted on the inner radial surface of the support structure so as to face the rotor with an air-gap formed therebetween. The stator winding comprises a multi-coil, one-layer winding which has a number of stator coils potted onto the support structure using a potting material which is disposed in gaps in the stator winding and between the stator winding and the inner radial surface of the support structure.

Preferably, the support structure, the stator winding, and the potting material form a single unitary mass lacking mechanical fasteners or tape holding the stator winding on its support structure. In one possible configuration, an inner radial surface of the support structure has a plurality of peripherally-spaced slots formed therein, and the stator winding comprises a plurality of stator coils, each of which is disposed in two non-adjacent, peripherally-spaced slots. Each of the slots is flanked by a pair of teeth which extends radially inwardly from the inner radial surface of the support structure and would aid in circumferentially locating the stator coils. A portion of each of the teeth may, if desired, be formed from a ferrous metal which would have the benefit of increasing flux linkage.

Another object of the invention is to provide a SER device which meets the first principal object and the stator of which is more-efficiently cooled than a standard air-cooled stator.

In accordance with another aspect of the invention, this object is achieved by using a liquid-cooled winding as the stator winding. The stator winding may, for instance, be formed from wire turns and have internal cooling tubes extending at least generally in parallel with the individual turns of the wire.

A second principal object of the invention is to provide an improved method of mounting a one-layer stator winding onto an associated support structure of a stator of an SER device so as to negate the need for any hangers, tape, rope, or other mechanical fasteners.

In accordance with another aspect of the invention, this object is achieved by potting each stator coil of the stator winding to two non-adjacent, peripherally-spaced locations on the support structure and potting the stator coils to one another.

Various potting options are available. For instance, the stator winding may be potted to the support structure via a one-step process that comprises 1) inserting an absorbent material such as felt into gaps in the stator winding and between adjacent stator coil sections and in gaps between the stator winding and the support structure, 2) depositing a resin into the stator so that the absorbent material absorbs resin and so that resin flows into other gaps not occupied by the absorbent material, and then 3) curing the resin. Alternatively, the stator winding may be potted to the support using a two-step process that comprises 1) positioning the stator winding on the support structure, 2) filling relatively small gaps in the stator winding and between the stator winding and the inner radial surface of the support structure with a first, relatively low-viscosity resin and curing the low-viscosity resin, 3) inserting a cylinder axially through the stator and forming an on-site mold from the resultant assembly, 4) filling the mold with a second resin, and 5) curing the second resin.

These and other objects, features and advantages of the invention will become apparent from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

Figure 1:
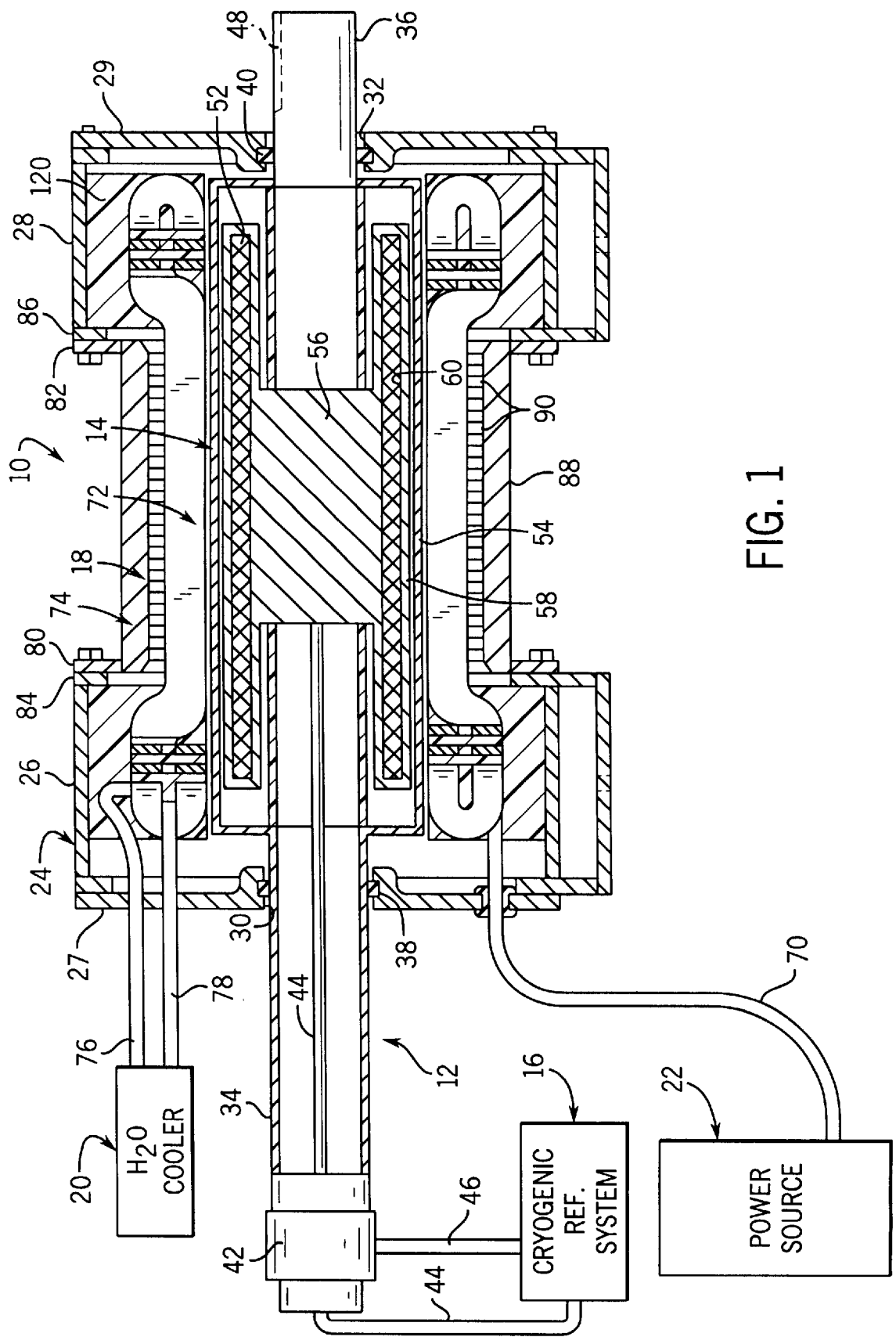
FIG. 1 is a sectional side elevation view of a SER device in the form of an HTS AC synchronous motor constructed in accordance with a preferred embodiment of the invention and also illustrating peripheral equipment associated with the motor.

Pursuant to a preferred embodiment of the invention, a superconducting electromechanical rotating (SER) device, such as a synchronous AC motor, includes a superconducting field winding and a one-layer stator winding that may be water-cooled. The stator winding is potted to its support structure and, accordingly, lacks hangers or other mechanical fasteners that otherwise would complicate stator assembly and require the provision of an unnecessarily large gap between adjacent stator coil sections. The one-layer winding topology, resulting in the number of coils being equal to half the number of slots or other mounting locations on the support structure, allows one to minimize or eliminate the gap between inner radial ends of adjacent straight sections of the stator coils while maintaining the gap between coil knuckles equal to at least the coil width, thereby providing sufficient room for electrical and cooling element configurations and connections. The stator winding may be potted to the support structure, for example, by a one-step VPI process relying on saturation of an absorbent material to fill large gaps in the stator winding or by a two-step process in which small gaps are first filled via a VPI or similar operation and larger gaps are then filled via an operation that utilizes the stator as a portion of an on-site mold.

2. SER Device Construction

The invention is applicable to any SER device such as a superconducting generator or a superconducting motor. Referring now to the drawings and initially to FIGS. 1 and 2 in particular, one such device includes an HTS AC motor 10 which includes a rotor 14 including a rotor shaft 12, a cryogenic refrigeration system 16 which cools the windings of the rotor 14, a stator 18 which drives the rotor 14 to rotate upon receiving an excitation current, a water cooler 20, and a power source 22. The stator 18 and rotor 14 are housed in a motor frame 24 including a central portion (possibly formed from the stator support structure 74 as detailed below) and first and second end caps 26 or 28. Each end cap 26 or 28 is 1) bolted or otherwise connected to an associated end of the central portion of the motor frame 24 at an inner end thereof and to an associated end plate 27 or 29 at an outer end thereof. Each end plate 27 or 29 has an opening 30 or 32 formed therein for receiving a respective shaft extension 34 or 36 of the rotor shaft 12, and 2) rotatably supports an associated shaft extension of the rotor shaft 12 by an associated bearing 38 or 40. The shaft extension 34 is hollow and receives a rotating cryogenic transfer coupling 42 which links the cryogenic refrigeration system 16 to the interior of the rotor 14 via respective supply and return conduits 44 and 46. The refrigerant may comprise any suitable cryogenic fluid such as gaseous helium, liquid nitrogen, liquid neon, or liquid oxygen. For the purpose of this HTS example, the refrigerant will be assumed to be gaseous helium. The second shaft extension 36 has a keyway 48 or the like for attachment to a driven shaft (not shown).

The rotor 14, per se, does not form part of the present invention and, accordingly, will be described only briefly. The rotor 14 rotates with the rotor shaft 12 and includes as its major components two torque tubes (not shown in detail), a rotor winding 52, a coil support structure 56 which supports the rotor winding 52, and a vacuum jacket 54 surrounding the coil support structure 56 to thermally insulate them from the environment. If desired, an AC flux shield (not shown) may cover the rotor winding 52. The coil support structure 56 is positioned axially centrally of the rotor 14 and has an outer radial portion 58 which is hollow so as to form a cavity 60 that houses the rotor winding 52. The coil support structure 56 is in intimate thermal contact with cryogenic fluid supplied by the supply conduit 44 and, therefore, is efficiently cooled by the cryogenic fluid to provide effective conductive heat transfer between the rotor winding 52 and the cryogenic fluid, thereby rendering the rotor winding 52 superconductive. The stator 18 receives AC current from a power source 22 via a supply line 70 and generates a rotating magnetic field to drive the rotor 14 to rotate. The stator 18 is configured to maximize the ability of the HTS rotor field winding 52 to increase the motor's efficiency and/or decrease the motor's volume. It includes as its major components 1) a stator winding 72 and 2) a support structure 74 which serves as a support surface for the stator winding 72 and which acts as a magnetic shield.

The illustrated and preferred stator 18 is cooled with a liquid for at least two reasons. First, liquid-cooling allows the magnitude of the line current to be increased, thereby permitting the volume of the motor 10 to be decreased. Second, the auxiliary power required for liquid-cooling is much smaller than for a comparable air-cooled stator. Liquid cooling is achieved by circulating a liquid coolant such as water through the stator 18 in a closed loop via supply and return conduits 76 and 78 extending between the water cooler 20 and the stator 18. The water cooler 20 may comprise a water-to-air heat exchanger and an associated pump or any other assembly which is capable of drawing heated water away from the stator 18 via the return conduit 78, cooling the heated water to a temperature which is, for example, near, at, or below ambient temperature, and returning the cooled water to the stator 18 via the supply conduit 76. To achieve the desired cooling effect, water-cooling tubes may be included in the support structure 74 itself and preferably are also included directly into the stator winding 72 in a manner detailed below.

The support structure 74 may comprise any structure or assembly capable of supporting the stator winding 72 and of magnetically shielding the stator winding 72 from surrounding structures. Hence, the support structure 74 may comprise a unitary laminated metal member configured to support the stator winding 72. However, in the illustrated embodiment, the support structure 74 comprises a composite member formed from an outer back-iron 88 and an inner non-metal ring stack. The back-iron 88 will typically be formed from a plurality of axially-stacked thin metal sheets sandwiched together and clamped by bolts or rods extending axially through the back-iron 88. Advantageously, the back-iron 88 also can form the central part of the motor frame 24. If (as in the illustrated embodiment) that is the case, the axial end sheets of the back-iron 88 may comprise thicker mounting rings 80 and 82 that are configured for connection to associated flanges 84 and 86 of the end caps 26 and 28 so that the support structure 74 and end caps 26 and 28, in combination, form the motor frame 24. The ring stack is formed from a plurality of non-metal rings 90 mounted in the opening of the back-iron 88 so as to present a plurality of axially extending, peripherally spaced slots 92, each of which is flanked by a pair of axially extending, peripherally spaced teeth. The short plastic teeth 94 may be replaced by short metal teeth if the inner ring 90 is eliminated and the teeth are instead formed directly in the back-iron 88. In that alternative configuration, the short metal teeth would provide a flux path near the outer radial end of the stator winding 72 where the widths of the gaps between adjacent stator coil sections are at a maximum. The teeth 94 need only be sufficiently long to provide slots of sufficient depth to locate the stator winding 72 prior to and during the potting process described in Section 3 below. Hence, they can extend substantially less than one-half the radial dimension of the coils of the stator winding 72, and preferably substantially less than one-quarter the radial dimension of the coils of the stator winding 72. As discussed below, they can also be eliminated entirely if outer suitable measures are taken to index the stator winding 72 before and during the potting operation.

Figure 5:
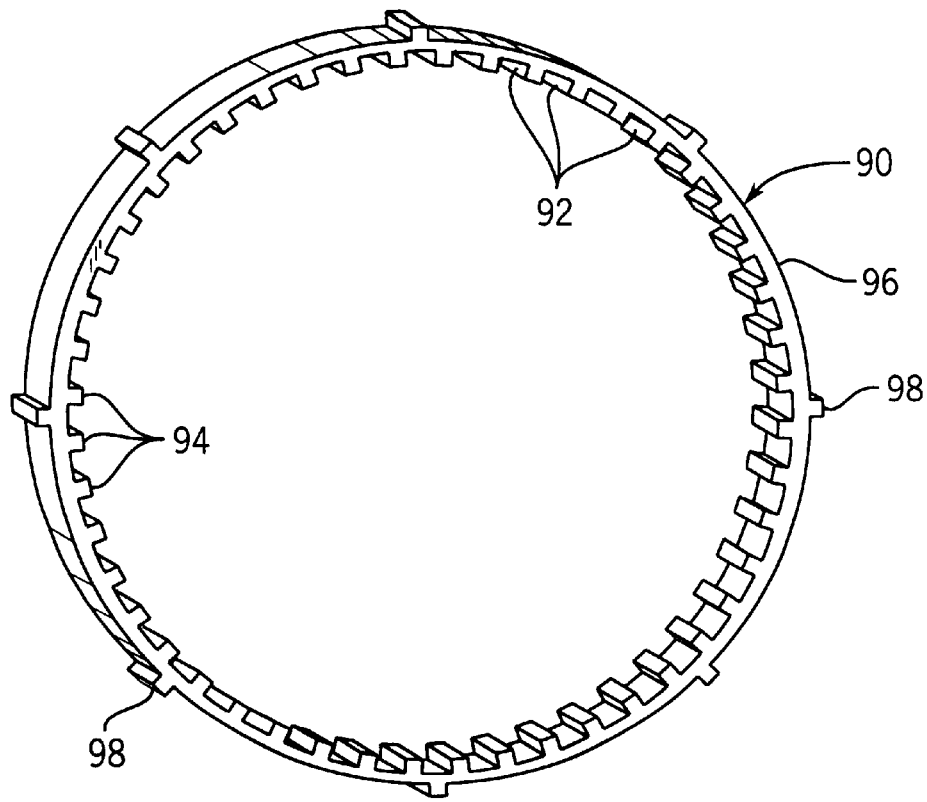
FIG. 5 is a perspective view of a portion of the support structure of the stator of FIGS. 3 and 4.

An exemplary ring 90 of the stack is shown in FIG. 5 and has an outer radial periphery 96 and an inner radial periphery. The outer radial periphery 96 is configured to be fixed to an inner radial periphery of the back-iron 88 using structures such as tabs 98 to prevent relative rotation between the two components. The inner radial periphery presents a short axial segment of the slots 92 and of the teeth 94. Of course, as discussed above, the ring stack may be eliminated if the slots 92 are formed directly in the back-iron 88 or if slots are eliminated entirely in a particular application.

The stator winding 72 is formed from a plurality of coils 100 potted in the slots 92 in the inner radial surface of the back-iron 74 as detailed in Section 3 below. It has a so-called one-layer topology which has one half as many coils 100 as slots 92 so that each of two straight sections 102 and 104 of each coil 100 is seated in two non-adjacent, peripherally spaced slots 92. The illustrated exemplary stator 18 includes 48 slots and 24 coils, although other permutations are certainly possible.

Figure 2:
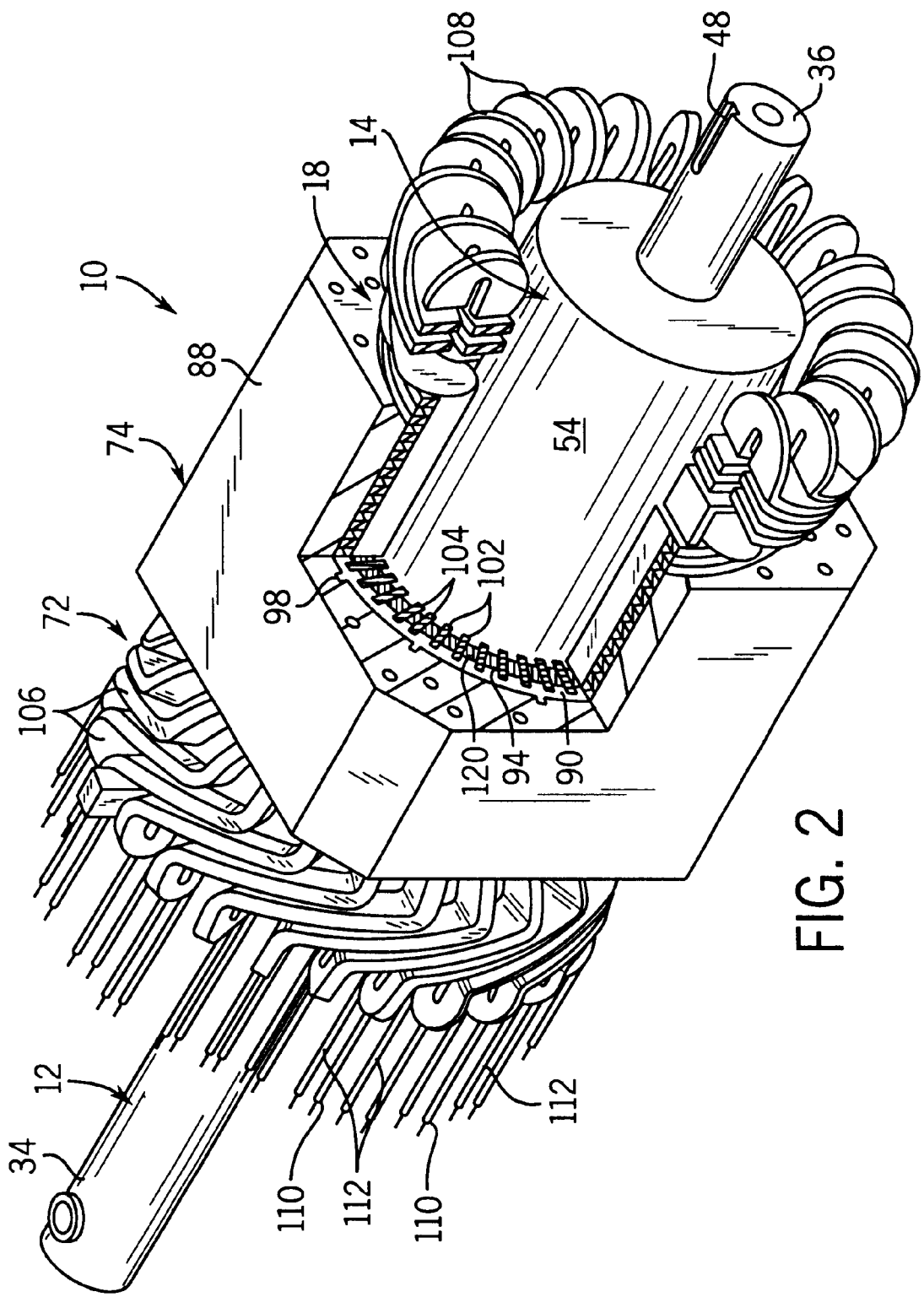
FIG. 2 is a cut-away perspective view of a portion of the motor of FIG. 1.
Figure 4:
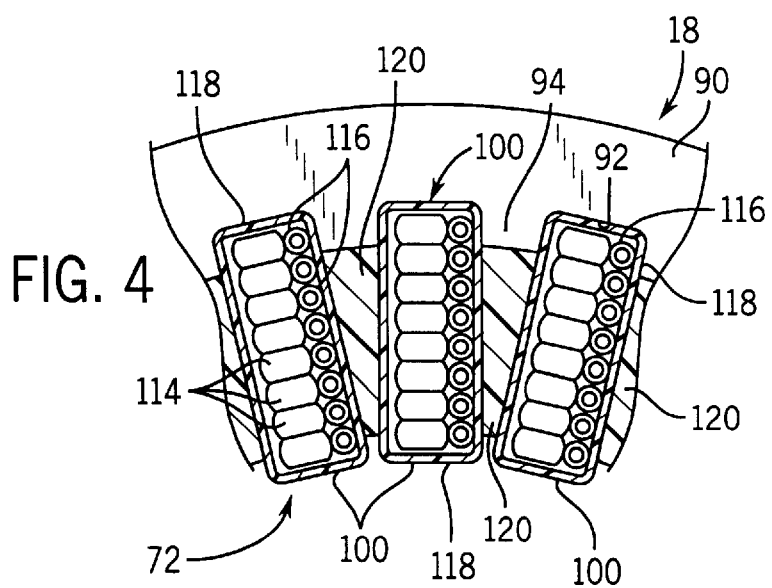
FIG. 4 is an enlarged sectional view of a portion of the stator of FIG. 3.
Figure 6:
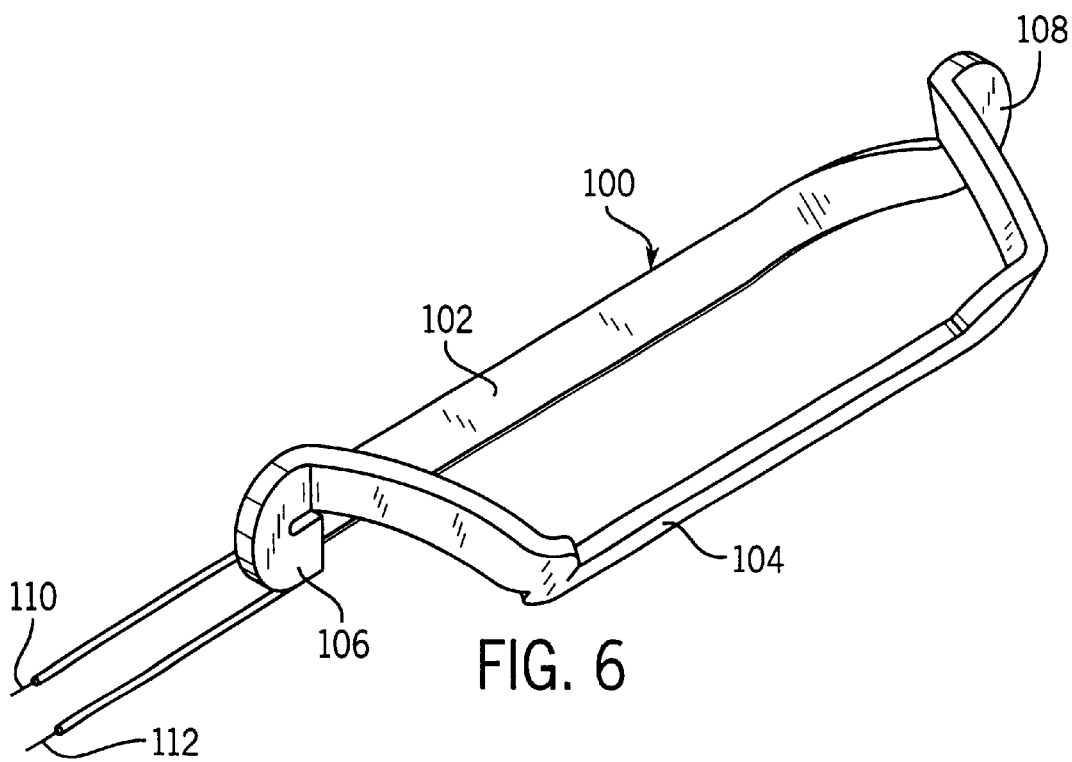
FIG. 6 is a perspective view of one of the coils of the stator winding of the stator of FIGS. 3 and 4.

A representative coil 100 is illustrated in FIG. 6 and includes first and second axially-straight portions 102 and 104 and an end windings forming opposed knuckles 106 and 108. Leads 110 and 112 extend from the vicinity of one knuckle 106 for electrical connection to the power source 22 (FIG. 1). The end windings and associated knuckles 106 and 108 are curved in a somewhat convoluted manner so that the individual coils 100 may overlap one another as seen in FIG. 2 so as to permit the straight portions 102 and 104 of the same coil 100 to fill non-adjacent slots 92 in the support structure 74 to obtain the desired motor characteristics. Referring to FIG. 4, each coil 100 is preferably formed from 1) a plurality (eight in the illustrated embodiment) of wire turns 114 and 2) a corresponding plurality of cooling tubes 116, each of which extends at least generally in parallel with an associated wire turn 114. The entire wire/cooling tube assembly of each coil 100 is then wrapped in insulation 118 to complete construction of the coil 100.

The single-layer topology of the stator winding 72 provides several advantages over a traditional two-layer topology in which the number of coils equals the number of slots. For instance, no mid-stick is required because there is exactly one phase per slot. The one-layer topology also permits the gap between the inner radial ends of the axially straight-portions 102 and 104 of adjacent coils 100 to be minimized or even eliminated entirely while still keeping the end winding length relatively short with a resultant relatively small end winding area. This winding geometry substantially increases the effective copper content and the current density of the winding stator 72 when compared to a comparable winding having a two-layer topology. In fact, the stator winding fill factor may be almost one hundred percent, and the motor power therefore is increased by approximately twenty-two percent when compared to a winding of a two-layer topology having the same size and efficiency. In addition, the spacing between adjacent coil knuckles 106 or 108 on a given end of the winding 72 is at least the width of the individual coils 100, providing sufficient room between adjacent coil knuckles for electrical and cooling tube connections.

Figure 3:
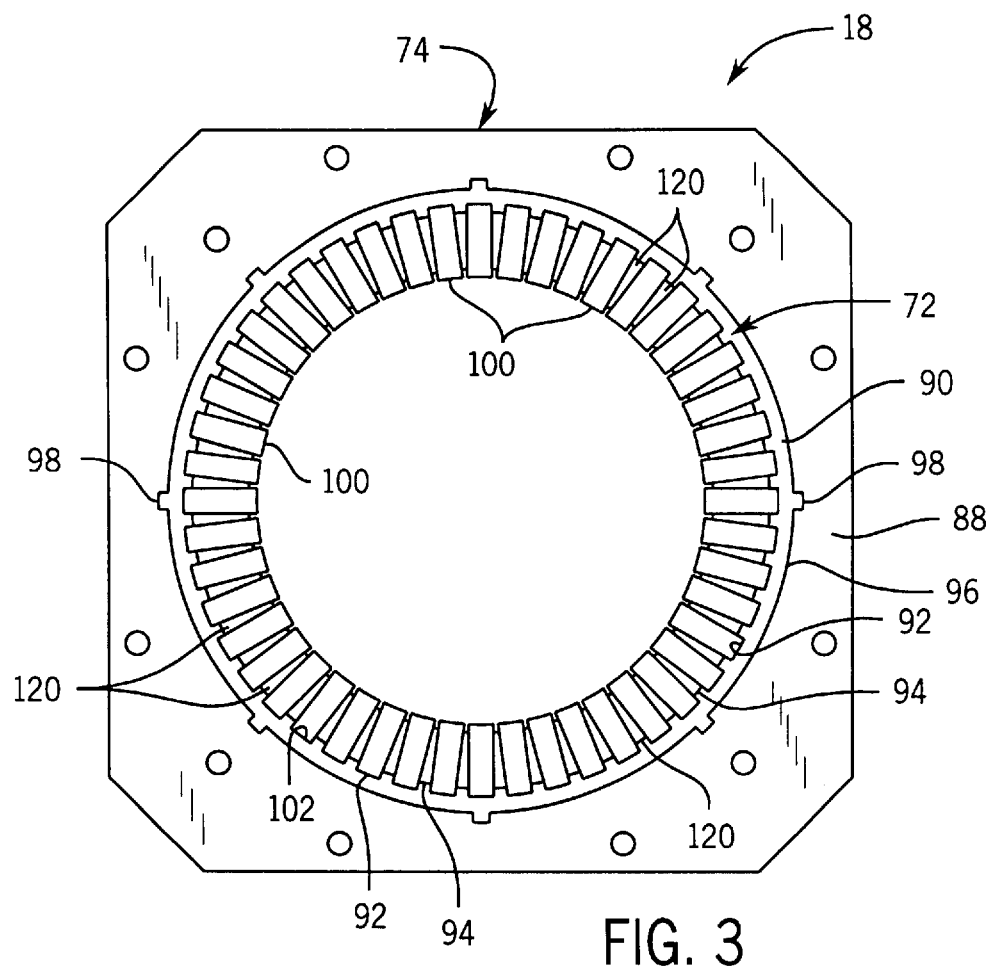
FIG. 3 is an end view of the stator of the motor of FIGS. 1 and 2.

Referring to FIGS. 3 and 4, the coils 100 are potted to the inner radial surface of the support structure 74 and to the end caps 26 and 28, preferably via one of the processes described in Section 3 below, using a potting material 120 that at least substantially fills all gaps between adjacent coil sections as well as between the coils 100 and the inner radial surface of the support structure 74. This potted connection eliminates the need for separate mechanical fasteners such as hangers and/or adhesive strips. This elimination greatly facilitates stator assembly, reduces the complexity of the motor 10, and also eliminates the need to provide gaps between adjacent coil sections that are sufficiently wide to accommodate mechanical fasteners. Potting also eliminates the need to employ large teeth between the slots to retain the stator winding 18 in its proper position within the slots 92. This permits the slots 92 to be flanked by relatively short non-metal teeth 94 as described above, by relatively short metal teeth, or to be eliminated altogether if some other technique is employed to retain the stator winding 72 in position before and during the potting process.

3. Potting Processes

The stator winding 72 may be potted to the inner radial surface of the support structure 74, and possibly to the end caps 26 and 28, via any suitable potting process that fixes the coils 100 of the stator winding 72 in place relative to one another and to the support structure 74 and end caps 26 and 28. Preferred techniques are those which form, in effect, a solid mass consisting of the potting material 120, the stator winding 72, the support structure 74, and the end caps 26 an 28. The potting material should fully encapsulate the stator winding 72, so that, other than possibly at the extreme inner diameter of the stator winding 72, no winding material protrudes from the potting layer. Two exemplary potting processes will now be described.

a. One-Step Potting Process

One way to pot the stator winding 72 to the support structure 74 and, if necessary in a given application, to the end caps 26 and 28 is via a one-step process such as the well-known vacuum pressure impregnation (VPI) process. Referring to the flowchart of FIG. 7 by way of example, one such one-step process 150 begins in Block 152 in which the stator winding 72 is formed from individual coils 100 as described above and the coils 100 are then mounted into the slots 92 in the inner radial peripheral surface of the support structure 74 in Block 154. The typical VPI process uses a relatively low-viscosity liquid resin which cannot be retained in relatively large gaps. In order to avoid this problem, any relatively large gaps between the straight portion of adjacent coils 100, between the end turns of adjacent coils 100, and between the coils 100 and the adjacent structures including the support structure 74 and the end caps 26 and 28, are filled in Block 156 using felt or another material that is sufficiently porous to absorb and become saturated with the low-viscosity resin. The stator winding 72 is then impregnated with the resin in Block 158 using a VPI process so that the relatively small gaps are filled directly with the liquid resin and so that the absorbent material (and, hence, the relatively large gaps) become saturated with the liquid resin. The resin is then cured in Block 160 so as to securely pot the stator winding 72 in place and to form the above-mentioned unitary mass. The resulting stator 18, formed from the support structure 74, the stator winding 72, the end caps 26 and 28, and the cured potting material 120, has essentially the configuration seen in FIG. 4. The stator 18 is now ready for connection to the end plates 27 and 29 of the motor frame 24.

b. Two-Step Potting Process

Figure 8:
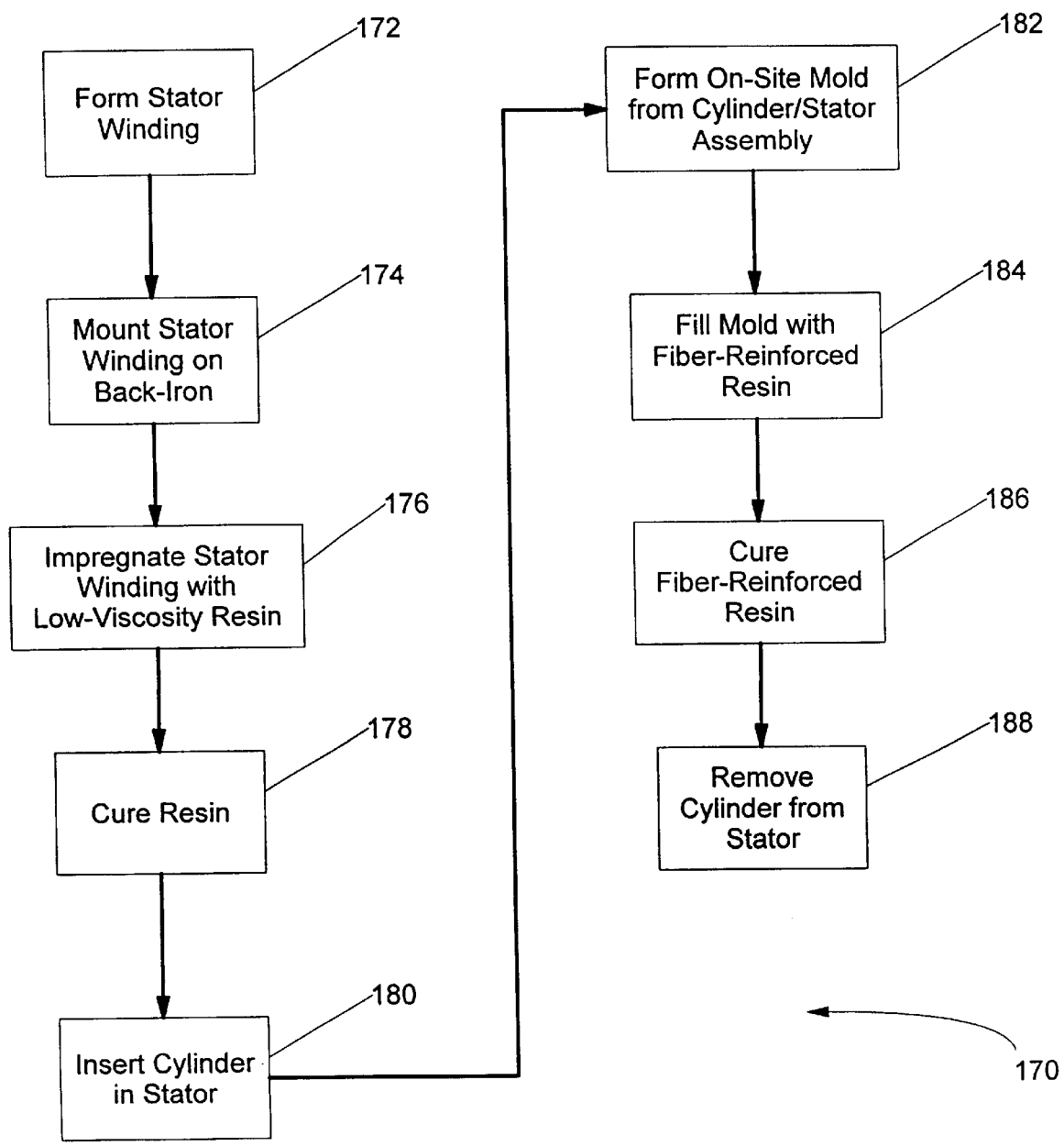
FIG. 8 is a flowchart of a two-step process for potting the stator winding to the support structure of the stator of FIGS. 3 and 4.

The stator winding 72 can also be potted to the support structure 74 via a two-step potting process such as the process 170 illustrated in FIG. 8. Process 170 begins with the formation of the stator winding 72 in Block 172 and proceeds to Block 174 in which the stator winding 72 is mounted in the slots 92 on the inner radial surface of the support structure 74. Then, in Block 176, the stator winding 72 is impregnated with a low-viscosity resin, using a VPI process or the like, so that those relative small gaps between adjacent coils 100 and between coils 100 and the support structure 74 are filled with resin. The resin is then cured in Block 178, hence fixing the stator winding 72 in place within the slots 92. However, the relatively large gaps in the winding 72 (including between the end turns of adjacent coils) and between the winding and the support structure 74 and the end caps 26 and 28 or other adjacent structures, remain open.

The relatively large gaps remaining after the curing of the low-viscosity resin are filled using an on-site molding operation that forms the second step of the potting process. Specifically, a cylinder, having a diameter essentially equal to the diameter of the air gap between the stator 18 and the rotor 14 of the finished motor 10, is inserted into the partially-formed stator in Block 180. The annulus between the cylinder and the support structure 74 is then sealed at both ends in Block 182 to form an on-site mold from the cylinder/stator assembly. Air is then pumped out of the mold from the top, and the mold is filled from the bottom with a second resin in Block 184. This second resin is preferably reinforced to increase its strength and, to this end, preferably comprises an epoxy reinforced with a fiber such as E-glass. The resin is then cured in block 186 to complete the potting process. After the resin is cured, the cylinder is removed from the assembly in Block 188. The finished stator 18 differs from the stator of FIGS. 3 and 4 only in that the potting material 120 extends radially inwardly from the inner radial surfaces of the coils 100 by a slight distance.

Figure 7:
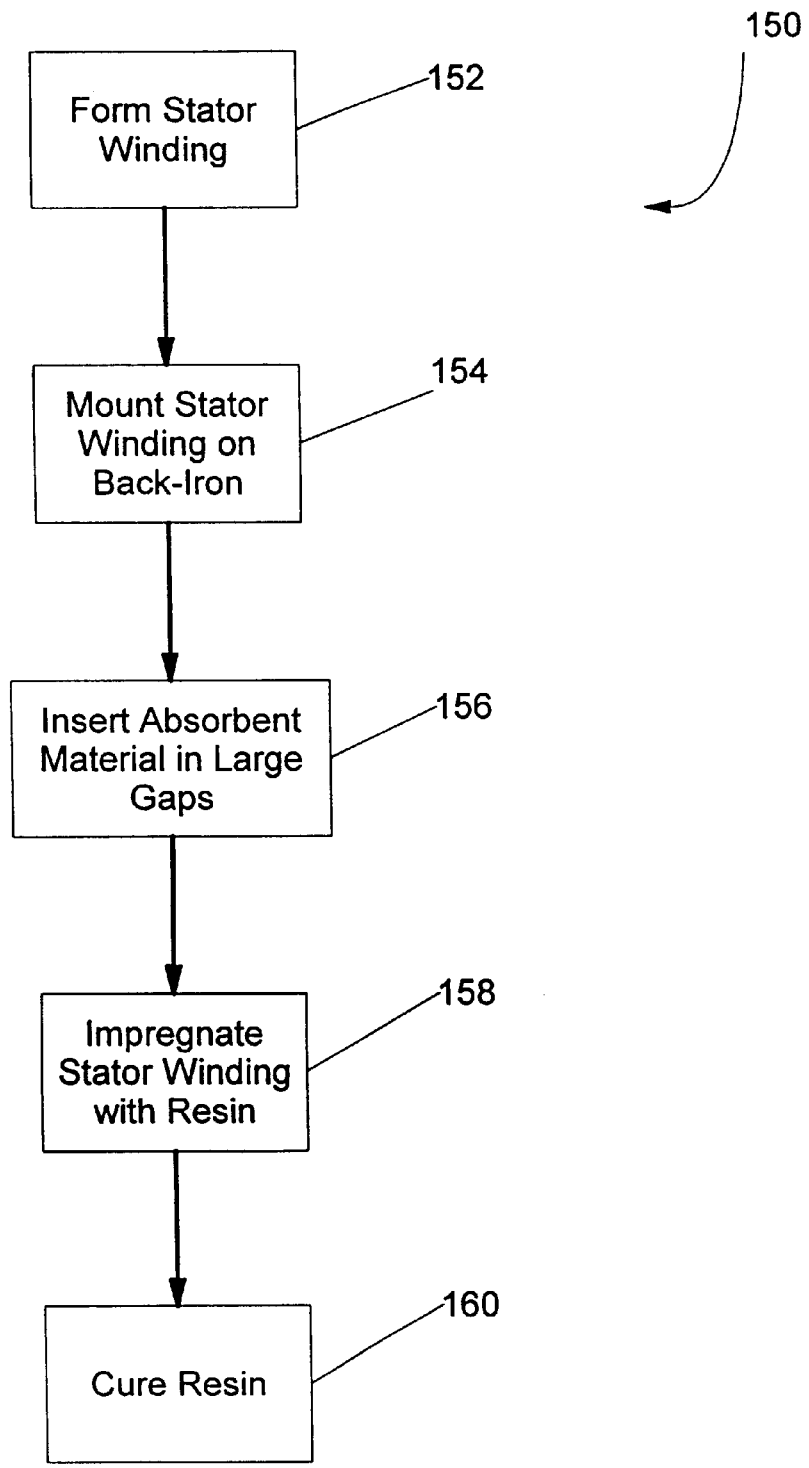
FIG. 7 is a flowchart of a one-step process for potting the stator winding to the support structure of the stator of FIGS. 3 and 4.

While a two-step process such as the process 170 of FIG. 8 requires an additional molding step when compared to a one-step process such as the process 150 of FIG. 7, it exhibits some advantages over the one-step process. Most noticeably, it permits large gaps in the stator 18 to be filled with a cured resin without having to laboriously insert an absorbent material in those gaps prior to impregnating the stator winding 72 with the resin. In addition, it may be possible in some applications to mold the end caps 26 and 28 of the motor frame 24 from the second resin during the on-site molding process, thereby eliminating the need to fabricate separate end caps and to connect them to the ends of the support structure 74.

4. Operation of Motor

In use, the motor 10 is readied for operation by pumping a cryogenic fluid such as gaseous helium through the coil support structure 56. Water or another liquid coolant is simultaneously circulated through the stator winding 72 via operation of the water cooler 20. Then, an AC current is supplied to the stator 18 from the power source 22 to produce a rotating magnetic field that drives the rotor 14 to rotate such that the rotor 14 is phase-locked at the synchronous speed and under balanced load conditions. The shaft 12 of the rotor 14 can then transfer power to another device via a driven shaft (not shown) keyed or otherwise affixed to the shaft extension 36 of the rotor shaft 12. The one-layer, water-cooled potted stator 18 provides increased output at a given power input and a given motor size when compared to other motors and other electromechanical rotor devices.

Many changes and modifications may be made to the present invention without departing from the spirit thereof. Some of these changes are discussed above. Other changes will become apparent from the appended claims.

We claim:

1. A superconducting electromechanical rotating device comprising:
    (A) a rotor including a rotor winding which is configured to be cooled with a cryogenic fluid so as to be rendered superconductive; and
    (B) a liquid-cooled stator which surrounds said rotor and which is selectively energizable with an electric current to drive said rotor to rotate, said stator including
        (1) a support structure; and
        (2) a stator winding mounted on said support structure so that an air-gap is formed between said rotor and said stator winding, said stator winding comprising a multi-coil, one-layer winding formed from plurality of stator coils potted onto said support structure using a potting material which is disposed in gaps in said stator winding and between said stator winding and said support structure, the potting material securing the coils to the support structure.

2. A superconducting electromechanical rotating device as defined in claim 1, wherein said support structure, said stator winding, and said potting material form a single unitary mass lacking mechanical fasteners or tape mounting said stator winding on said said support structure.

3. A superconducting electromechanical rotating device as defined in claim 1, wherein said potting material comprises a resin comprising an epoxy reinforced with fibers.

4. A superconducting electromechanical rotating device as defined in claim 1, wherein said stator winding is a water-cooled winding.

5. A superconducting electromechanical rotating device as defined in claim 4, wherein said stator winding is formed from wire turns and has internal cooling tubes extending at least generally in parallel with individual turns of said wire.

6. A superconducting electromechanical rotating device as defined in claim 1, wherein said device is a high temperature superconducting synchronous AC motor.

7. A superconducting electromechanical rotating device comprising:
    (A) a rotor including a rotor winding which is configured to be cooled with a cryogenic fluid so as to be rendered superconductive; and
    (B) a liquid-cooled stator which surrounds said rotor and which is selectively energizable with an electric current to drive said rotor to rotate, said stator including:
        (1) a support structure; and
        (2) a stator winding mounted on said support structure so that an air-gap is formed between said rotor and said stator winding, said stator winding comprising a multi-coil, one-layer winding formed from plurality of stator coils potted onto said support structure using a potting material which is disposed in gaps in said stator winding and between said stator winding and said support structure;
wherein said potting material comprises 1) a resin and 2) an absorbent material which is disposed in at least some of said gaps and which is saturated with said resin.

8. A superconducting electromechanical rotating device comprising:
    (C) a rotor including a rotor winding which is configured to be cooled with a cryogenic fluid so as to be rendered superconductive; and
    (D) a liquid-cooled stator which surrounds said rotor and which is selectively energizable with an electric current to drive said rotor to rotate, said stator including:
        (3) a support structure; and
    a stator winding mounted on said support structure so that an air-gap is formed between said rotor and said stator winding, said stator winding comprising a multi-coil, one-layer winding formed from plurality of stator coils potted onto said support structure using a potting material which is disposed in gaps in said stator winding and between said stator winding and said support structure;
wherein said stator is mounted, at least in part, on an inner radial surface of said support structure, and wherein said inner radial surface of said support structure has a plurality of peripherally-spaced slots formed therein, and wherein each of said stator coils is disposed in two non-adjacent slots.

9. A superconducting electromechanical rotating device as defined in claim 8, wherein each of said slots is flanked by a pair of teeth which extend radially inwardly from said inner radial surface of said support structure.

10. A superconducting electromechanical rotating device as defined in claim 9, wherein at least a portion of each of said teeth is formed from a ferrous metal and has a radial length which is less than one half a radial dimension of an associated stator coil portion.

11. A superconducting electromechanical rotating device as defined in claim, 10 wherein said portion of each of said teeth has a radial length which is less than one fourth the radial dimension of the associated stator coil portion.

12. A high temperature superconducting (HTS) electromechanical rotating device comprising:
    (A) a rotor including a rotor winding which is cooled with a cryogenic fluid so as to be rendered superconductive; and
    (B) a stator which surrounds said rotor and which is selectively energizable with an AC electric current to drive said rotor to rotate, said stator including
        (1) a support structure which surrounds said rotor and which has an inner radial surface which faces an outer radial surface of said rotor and which has a plurality of peripherally-spaced slots formed therein, each of which is flanked by a pair of teeth extending radially-inwardly from said surface; and
        (2) a water-cooled stator winding supported in said slots so as to face said rotor with an air-gap formed therebetween, said stator winding comprising a multi-coil, one-layer winding which has a number of stator coils which is equal to one-half the number of slots said in said inner radial surface of said support structure, wherein said stator winding is potted in said slots using a potting material that is disposed in gaps formed between adjacent straight sections of said stator winding, between adjacent end turns of said stator winding, and between said stator winding and said inner radial surface of said support structure, wherein each of said stator coils is disposed in two non-adjacent slots, and wherein said support structure, said stator winding, and said potting material form a single unitary mass.

13. A HTS electromechanical rotating device as defined in claim 12, wherein said potting material comprises an epoxy which is reinforced with glass fibers.

14. A HTS electromechanical rotating device as defined in claim 12, wherein said potting material comprises 1) a resin and 2) an adsorbent material which is disposed in at least some of said gaps and which is saturated with said resin.

15. A HTS electromechanical rotating device as defined in claim 12, wherein at least a portion of each of said teeth is formed from a ferrous metal and has a radial length which is less than one half a radial dimension of an associated stator coil.

16. A HTS electromechanical rotating device as defined in claim 15, wherein said portion of each of said teeth has a radial length which is less than one fourth the radial dimension of the associated stator coil.

17. A HTS electromechanical rotating device as defined in claim 12, wherein said device is a synchronous AC motor having a rotor winding which is cooled by helium.

18. A method of mounting a liquid-cooled, multi-coil, one-layer stator winding of a superconducting electromechanical rotating device on a support structure of a stator of said device, said method comprising: potting each stator coil of said stator winding to two non-adjacent, peripherally-spaced locations on said support structure and potting said stator coils to one another.

19. A method as defined in claim 18, wherein the potting step comprises:
   inserting an absorbent material into gaps in said stator winding and between said stator winding and said support structure;
   depositing a resin into said stator so that said absorbent material absorbs said resin and so that said resin flows into other gaps not occupied by said absorbent material; and then
   curing said resin.

20. A method as defined in claim 19, wherein the resin is deposited via a vacuum pressure impregnation process.

21. A method as defined in claim 18, wherein the potting step comprises:
   positioning said stator winding on said support structure;
   filling relatively small gaps in said stator winding and between said stator winding and said support structure with a first, relatively low-viscosity resin and curing said low-viscosity resin;
   inserting a cylinder axially through said stator and forming an on-site mold from the resultant assembly;
   filling said mold with a second resin; and
   curing said second resin.

22. A method as defined in claim 21, wherein the step of forming an on-site mold comprises sealing said assembly, and wherein the step of filling said mold with said second resin comprises pumping air out of said mold and filling said mold with said second resin.

23. A method as defined in claim 21, wherein said cylinder is approximately equal in diameter to a diameter of an air gap of said device, and further comprising, following the step of curing said second resin, removing said cylinder and mounting said stator over a rotor having a winding which is configured to be cooled with a cryogenic fluid.

24. A method as defined in claim 21, wherein said second resin is a fiber-reinforced resin.

25. A method as defined in claim 21, wherein the step of filling said relatively small gaps in said stator winding comprises impregnating said stator winding with said first resin via a vacuum pressure impregnation process.

26. A method comprising:
   (A) providing a rotor of a superconducting electromechanical rotary device, a rotor winding of said rotor being configured to be cooled by circulating a cryogenic fluid therethrough;
   (B) installing a multi-coil, one-layer stator winding onto an inner radial surface of a support structure of a stator of said device such that each coil of said stator winding is seated in two non-adjacent, peripherally spaced slots in said inner radial surface of said support structure, said stator winding being configured to be cooled by circulating a liquid coolant therethrough;
   (C) potting said stator winding to said inner radial surface of said support structure so as to mount said stator winding on said support structure without using any mechanical connectors, said potting step comprising
      (1) impregnating gaps in said stator winding and between said stator winding and said inner radial surface of said support structure with a resin, and
      (2) curing said resin; and
   (D) mounting said stator over rotor of said device, said rotor having a rotor winding which is configured to be cooled with a cryogenic fluid.

27. A method as defined in claim 26, wherein the potting step comprises:
   inserting an absorbent material in relatively large gaps in said stator winding and between said stator winding and said inner radial surface of said support structure;
   impregnating said stator winding with said resin so that said absorbent material absorbs said resin and so that said resin flows into other, relatively small gaps not occupied by said absorbent material, wherein said resin is deposited in a vacuum pressure impregnation process; and then
   curing said resin.

28. A method as defined in claim 26, wherein the potting step comprises:
   filling relatively small gaps in said stator winding and between said stator winding and said inner radial surface of said support structure with a first, relatively low-viscosity resin via a vacuum pressure impregnation process and curing said low-viscosity resin; then
   curing said first resin; then
   inserting a cylinder axially through said stator to form an assembly;
   forming an on-site mold from said assembly by sealing said assembly and positioning said mold so that an axis thereof extends at least generally vertically;
   pumping air out of said mold and filling said mold with a second resin comprising a fiber-reinforced epoxy; and then
   curing said second resin; and further comprising
      removing said cylinder from said stator after said second resin cures and prior to the step of mounting said stator around said rotor.

* * * * *